United States Patent
Jiang et al.

(10) Patent No.: US 7,958,476 B1
(45) Date of Patent: Jun. 7, 2011

(54) METHOD FOR MULTI-CYCLE PATH AND FALSE PATH CLOCK GATING

(75) Inventors: Yunjian (William) Jiang, San Jose, CA (US); Arvind Srinivasan, San Jose, CA (US); Samit Chaudhuri, Cupertino, CA (US)

(73) Assignee: Magma Design Automation, Inc., San Jose, CA (US)

( * ) Notice: Subject to any disclaimer, the term of this patent is extended or adjusted under 35 U.S.C. 154(b) by 347 days.

(21) Appl. No.: 12/170,354

(22) Filed: Jul. 9, 2008

Related U.S. Application Data

(60) Provisional application No. 60/948,760, filed on Jul. 10, 2007.

(51) Int. Cl.
*G06F 17/50* (2006.01)
(52) U.S. Cl. ........... 716/109; 716/101; 713/320; 703/15
(58) Field of Classification Search ............... 716/109, 716/101; 713/320; 703/15
See application file for complete search history.

(56) References Cited

U.S. PATENT DOCUMENTS

| | | | | |
|---|---|---|---|---|
| 5,537,580 A * | 7/1996 | Giomi et al. | .................... | 716/19 |
| 5,649,176 A * | 7/1997 | Selvidge et al. | .............. | 713/400 |
| 5,691,912 A * | 11/1997 | Duncan | ........................... | 716/11 |
| 5,774,738 A * | 6/1998 | Hillan | ............................... | 712/1 |
| 5,926,396 A * | 7/1999 | Ohara | ............................... | 716/4 |
| 6,034,563 A * | 3/2000 | Mashiko | ........................ | 327/544 |
| 6,195,786 B1 * | 2/2001 | Raghunathan et al. | ............ | 716/2 |
| 6,298,472 B1 * | 10/2001 | Phillips et al. | .................... | 716/18 |
| 6,308,313 B1 * | 10/2001 | Lakshminarayana et al. | .. | 716/18 |
| 6,434,722 B2 * | 8/2002 | Kawarabayashi et al. | ......... | 716/3 |
| 6,704,878 B1 * | 3/2004 | Benini et al. | ................... | 713/321 |
| 7,080,334 B2 * | 7/2006 | Fan et al. | ........................... | 716/6 |
| 2004/0225978 A1 * | 11/2004 | Fan et al. | ........................... | 716/6 |
| 2008/0015838 A1 * | 1/2008 | Stern | ............................... | 703/15 |

OTHER PUBLICATIONS

Benini et al.; "Saving Power by Synthesizing Gated Clocks for Sequential circuits"; Design & Test of Computers, IEEE; vol. 11, Issue: 4; Publication Year: 1994, pp. 32-41.*

* cited by examiner

*Primary Examiner* — Naum Levin
(74) *Attorney, Agent, or Firm* — Kilpatrick Townsend & Stockton LLP

(57) ABSTRACT

A power optimization method of deriving gated circuitry in an integrated circuit (IC) is provided. A design description of the IC is received and analyzed. A state machine is identified based on the analysis. One or more candidate blocks are determined to be capable of being disabled. At least one of the candidate blocks is selected based on one or more states of the state machine. A gating circuit is inserted for gating the selected candidate block(s). In another embodiment of power optimization, one or more state machines are identified and a synthesized netlist is generated. One or more candidate blocks in the synthesized netlist are determined to be capable of being disabled. At least one of the candidate blocks is selected based on one or more states in the state machine, and a gating circuit is inserted for gating the selected candidate block(s).

21 Claims, 17 Drawing Sheets

METHOD FOR MULTI-CYCLE PATH AND FALSE PATH CLOCK GATING

CROSS-REFERENCES TO RELATED APPLICATIONS

This application claims the benefit of U.S. Provisional Application No. 60/948,760, filed Jul. 10, 2007, entitled "Method for Multi-Cycle Path and False Path Clock Gating," which disclosure is incorporated herein by reference for all purposes. This application is related to U.S. patent application Ser. No. 12/128,554, filed May 28, 2008, entitled "A Method for Automatic Clock Gating to Save Power," which disclosure is incorporated herein by reference for all purposes.

BACKGROUND OF THE INVENTION

This invention relates generally to the field of chip design and more particularly to a method for multi-cycle path and false path clock gating.

Semiconductor chips are composed of complex electronic circuit arrangements. With each progressive generation of semiconductor technology the on-chip power utilized radically increases. Accordingly, one concern to chip designers is the limitation of power consumption. In order to reduce the chip power consumption, various circuit and architectural techniques have been employed. Both dynamic power and static power are of significant concern in today's technologies. Dynamic power is the power that is generated due to switching on the semiconductor chip. Static power consumption has increased with each new technology due to higher leakage currents. These leakage currents lead to a large amount of standby or static current, even though no switching is taking place.

One method for reducing dynamic power has been the reduction of the chip cycle rate since chips consume less power when operating at lower frequencies. Operating a chip at a slower speed, however, leads to a corresponding lower performance. Lower performance is not a viable option given the insatiable customer demand for higher performance, and thus greater processing power. Another method for improving chip power consumption has been the reduction of power supply voltage across the entire chip. Since chip power is proportional to the square of the supply voltage, any reduction in power supply voltage has a radical impact on reducing the power consumption. However, as the supply voltage is reduced the performance also reduces, creating a dilemma for the chip designer. In order to save power without adversely impacting the chip performance, chips have been segmented into different portions with different power supplies depending on the performance requirement. Power may also be saved by selectively shutting off power supplies to logic when it is not being utilized. A large block of logic may be shut down or individual gates or groups of gates may be shut down. An MTCMOS library is designed so that individual gates may be powered down as desired by an appropriate control signal.

A further concept that has been utilized to save power is clock gating. By gating the clock, switching power is reduced. The decision to perform clock gating and what logic circuits to gate has typically been a laborious, designer intensive job. Given this significant effort and the fact that the amount of on chip logic has grown radically, obtaining a truly optimal gating arrangement has become problematic. It is highly unlikely for any designer to identify all of the circuit portions which can be clock gated to save power and to properly implement the clock gating. Further, a clock gating circuit itself occupies chip area and consumes additional power.

Clock gating of certain types of circuitry is more difficult than others. Multi-cycle paths and false paths are among these types of circuits and a progressively larger portion of on-chip circuits constitute these multi-cycle paths and false paths. A multi-cycle path is a logic path where the timing requires more than a single clock cycle to determine the result. For example, from a flip flop output to the next flip flop's input, the logic calculation time in the path is more than a single clock cycle. There can be multi-cycle paths which are two, three, or even more clock cycles in length. In other words, a multi-cycle path in a sequential circuit is a path that does not have to propagate signals in a single clock cycle. A false path is one where a certain path through the logic can never be encountered during actual operation. Due to control logic and the functional logic, a calculation may never have a certain path exercised. Both multi-cycle paths and false paths can have state machines (SM) that control them. State machines are also referred to as Finite State Machines (FSM) where the number of states, transitions between the states, and the actions performed are finite. One problem is that multi-cycle paths and false paths can consume power uselessly because they can consume power without providing a function calculation.

BRIEF SUMMARY OF THE INVENTION

Techniques for a method for automatic clock gating of multi-cycle path and false paths are described herein. Embodiments of the present invention are able to reduce the switching power consumed on electronic circuits having one or more functional blocks. In one embodiment of the present invention, logic circuit blocks that can be clock-gated are identified using a design automation tool. Clock gating logic is inserted automatically thus producing a circuit which consumes less power. The techniques described herein may be extended for automatic insertion of power gating logic.

In accordance with an embodiment of the invention, a power optimization method of deriving gated circuitry of an integrated circuit (IC) includes the following steps: receiving a design description of the IC, analyzing the design description of the IC, identifying a state machine based on the analysis, determining that one or more candidate blocks in the design description of the IC which are capable of being disabled, selecting at least one of the candidate blocks based on one or more states in the state machine, and inserting a gating circuit in the design description of the IC for gating the selected candidate block(s). The analysis of the IC design description may include identifying the one or more states in the state machine from the design description of the IC, and also identifying one or more state transitions in the state machine from the design description of the IC. A complete state machine may comprise states and/or transitions between the states.

The identified state machine(s) may be used for power optimization. In accordance with another embodiment of the invention, a power optimization method of deriving gated circuitry in an integrated circuit (IC) design includes the following steps: identifying one or more state machines in a representation of the IC design, generating a synthesized netlist of the IC design based on the representation of the IC design, determining one or more candidate blocks in the synthesized netlist which are capable of being disabled, selecting at least one of the candidate blocks based on one or more states in the state machine, and inserting a gating circuit in the IC design for gating the selected candidate block(s). In one embodiment of the invention, the downstream logic includes a multi-cycle path. In another embodiment of the invention, the downstream logic includes a false path. The disable candidate blocks may be determined by identifying downstream logic of at least one state machine of the one or more state machines, and analyzing the downstream logic. A sequential element that is controlled by the state machine is identified. A gating condition in the state machine that inhibits a clock transition in the sequential element is also identified.

BRIEF DESCRIPTION OF THE DRAWINGS

The invention may best be understood by reference to the following description taken in conjunction with the accompanying drawings in which.

DETAILED DESCRIPTION OF THE INVENTION

In one embodiment of the systems and methods described herein, blocks which are capable of being gated are quickly and automatically identified by the design automation tool. Circuit designers are no longer required to individually identify each and every block to be gated, leading to significant time and cost savings for production of an integrated circuit. Moreover, an optimized clock gating solution may be adopted into the integrated circuit (IC) design after automatic analysis and evaluation of the various gating options, resulting in a chip design with increased switching power efficiency.

Various challenges arise for automated gating involving multi-cycle paths or false paths. Multi-cycle paths involve sequential behavior requiring analysis of the circuit beyond the combinational logic of a single clock cycle. State machines (SM) may aid in the determination of candidate blocks for gating purposes. As used herein, a SM is a set of registers and interconnecting logic from the circuit design. In one embodiment, sequential circuitry, such as flip flops, may represent states within the SM and transitions between the states may also be represented. The determination of a useful SM may involve careful identification of one or more sequential elements as states and their related transitions. The SM can be used to effectively minimize power consumption in the circuit design.

Figure 1A:
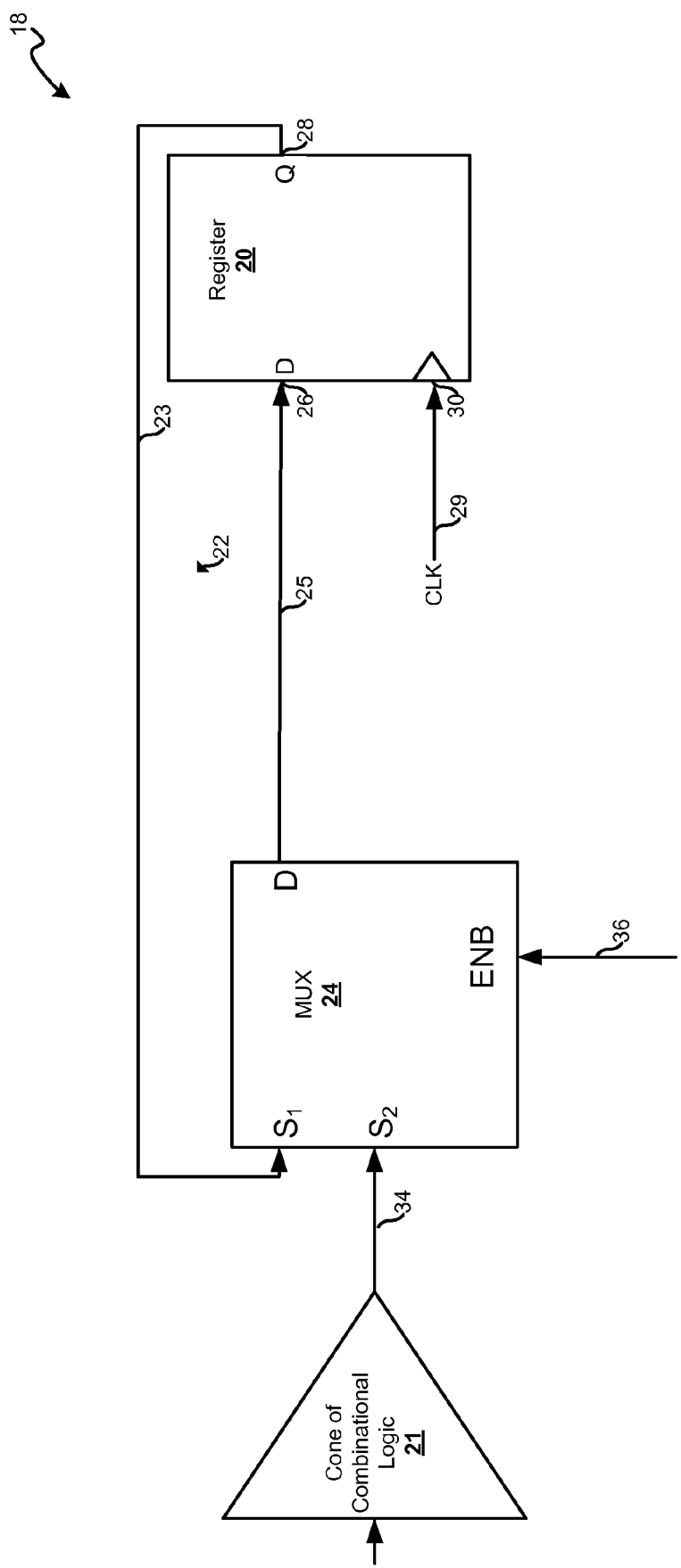
FIG. 1A is a schematic illustration of a pre-clock gated circuit design which includes a sequential element associated with a feedback loop that includes arbitrary combinational logic circuitry.

Although clock gating saves on-chip power, clock gating circuitry itself consumes power. Clock gating can be performed on a single storage element, commonly referred to as a flip flop (or even more simply as a flop), but the clock gating circuit area may be non-trivial. In one embodiment, simultaneously gating more than a single element at a time is performed. Traditionally, power consumption in integrated circuits has been reduced by clock-gating. This technique reduces the consumption of switching power. FIG. 1A is a schematic illustration of a pre-clock gated circuit design 18 which includes a sequential element associated with a feedback loop that includes arbitrary combinational logic circuitry. As shown, a sequential element 20 (i.e., register) is associated with a feedback loop 22 and arbitrary combinational logic circuitry 24. The combinational logic is shown conceptually as a multiplexer which includes input pins $S_1$ and $S_2$ and an enable ENB input. A cone of combinational logic 21 drives data signal path 34, which is fed into the $S_2$ input pin and a data signal path 36 feeds into the ENB input. The combinational logic circuitry 24 may pass either load data or reload data to a data input node 26 of the sequential element 20. Reload data is data that is fed back from an output node 28 of sequential element 20 to its input node 26. Load data is data other than reload data. The associated feedback loop 22 includes a data signal path 23 from the output node 28 of the sequential element 20 to the combinational logic 24. The associated feedback loop 22 also includes a data signal path 25 from the combinational logic circuitry 24 to the input node 26 of the sequential element 20. It will be appreciated that the feed back loop 22 permits feedback of reload data from data output node to data input node of sequential element 20. This reloading, or data feedback, can result in unnecessary power dissipation because the input to the register 20 does not change.

Figure 1B:
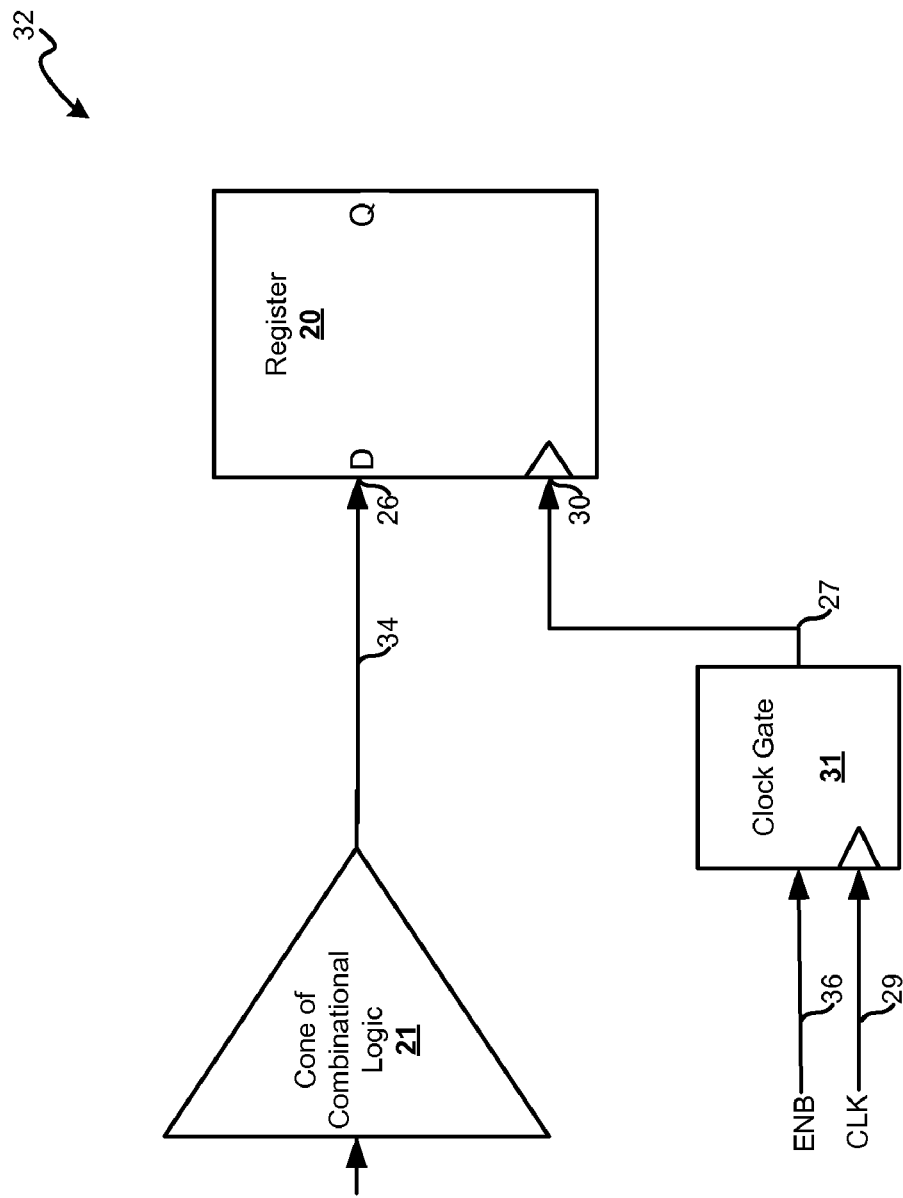
FIG. 1B is a schematic illustration of a post-clock gated circuit design which includes a sequential element and clock gate circuitry.

Typical solutions provide for gating of a clock signal source CLK 29 to a clock node 30 of the sequential element 20. FIG. 1B is a schematic illustration of a post-clock gated circuit design 32 which includes a sequential element and clock gate circuitry. As shown, the data signal 34 which originally fed into the $S_2$ input of the combinational logic circuitry 24 of FIG. 1A is now fed into the D pin input 26 of the sequential element 20 from the cone of combinational logic 21. Moreover, a gated clock signal path 27 couples the clock signal source CLK 29 to the clock node 30 of the sequential element 20. The clock signal path 27 is gated by the clock gate 31, which takes as inputs the enable signal 36 from the combinational logic circuitry 24 and the clock source CLK 29. Typical designs use the enable signal 36 as a clock gate enable. If the enable signal 36 is at 1, the clock signal is propagated to the register 20, otherwise the clock signal is blocked. Thus, clock gating avoids unnecessary clocking of sequential element 20 during clock cycles when stored data is to remain unchanged.

Figure 2:
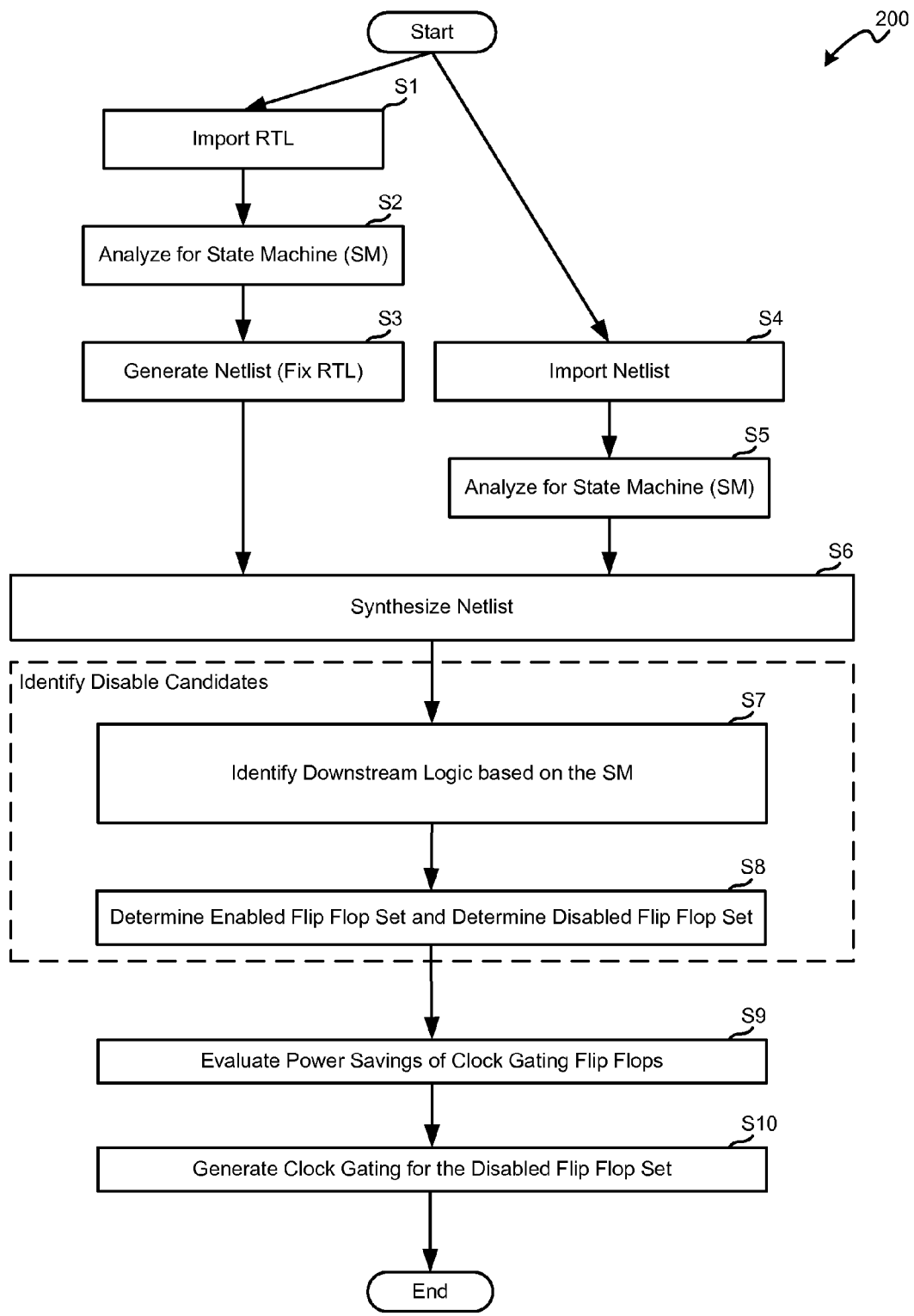
FIG. 2 is an automated process flow diagram for integrated circuit design which illustrates one method for multi-cycle path and false path clock gating, in accordance with an embodiment of the invention.

FIG. 2 is an automated process flow diagram for integrated circuit design which illustrates one method for multi-cycle path and false path clock gating, in accordance with an embodiment. The logic which can be clock gated is identified. At step S1, an abstract representation of a circuit design such as an RTL description of a circuit design (e.g., a VHDL, Verilog, other high level logic descriptor language) is imported. At step S2, analysis is performed on the RTL for a state machine (SM). The low power optimization methods as taught herein may be performed in one or more stages of the design flow. In one embodiment, the RTL description is converted into one or more data-flow-graphs (DFG). As known by those skilled in the art, a DFG may include functional blocks, such as multipliers, which are connected through high-level operators. The DFG may be optimized for low power consumption. The analysis may include conversion of the DFG into a state machine. The manner in which state machines are identified in the RTL is described in further detail with regard to FIG. 3A.

At step S3, a generate netlist or fix RTL step is performed. The RTL/DFG logic may be analyzed and a netlist may be generated, whereby the RTL description is converted to a netlist (i.e., a logic gate-level netlist synthesized from a behavioral description of an integrated circuit or a portion of an integrated circuit) representation of the circuit design.

As previously mentioned, the low power optimization methods as taught herein may be performed in one or more stages of the design flow. An alternative path for invoking a design is described. In one embodiment, the netlist may be generated externally from the process flow 200. Accordingly, at step S4, the netlist is imported into the tool rather than being generated from the RTL. The imported netlist brings a gate-level design into the design flow.

At step S5, analysis is performed on the netlist for a state machine (SM). Analysis of the netlist is more complicated than for the RTL at least because designers may not have indicated designations of state machines using the well-known constructs. The analysis may include conversion of the netlist into a state machine. State machines may be identified in the imported netlist, regardless of whether or not state machines were previously identified by the designer or design tool. The manner in which state machines are identified in the netlist is described in further detail with regard to FIG. 4A.

At step S6, the netlist is synthesized. The logic of the netlist may be analyzed and cells to implement the logic may be selected. In some embodiments this step is performed using the command "Fix Netlist," or "Generate Netlist Based on Global Cell Models."

One or more disable candidates may be identified, for example in the synthesized netlist. In particular, the actual sequential elements to be clock-gated are identified using the state machine. At step S7, downstream logic is identified to determine reachable states from the state machine determined at S2 and/or S5. Logic downstream from each state machine may also be identified, up to and including the next flip flops which receive calculated data. In other words, the output logic of the state machine is analyzed to identify the sequential elements (i.e., flip flops, registers, etc.) which are controlled by the state machine. As used herein, "control" by a state machine refers to the control of whether the sequential element holds its current state or updates its state to a new value.

Many methods of identifying the controlled sequential elements may be used. For example, for each state in a state machine, the downstream flip flops are examined. In another embodiment, using the gate-level netlist, Boolean analysis may be performed to identify clock gate enable signals that indicate that the sequential elements will maintain their state. The condition under which a clock transition is inhibited is known as the gating condition or activation logic function. The gating condition may be a function of variables from previous time frames. Accordingly, the fan-in cone of logic for each flip flop can be examined along with the sequential element itself. A loop is identified which goes from the output Q of the flop back to the input D of the same flop. In such a loop, the data is held by the sequential element when the data output of the element loops back to its data input. If the loop back is active, then the value stored by the sequential element will not change. A sequential element with such feedback loop may be viewed as being in a hold mode during a clock cycle when its current value is fed back as an input signal. Based on these types of analyses, or a subset thereof, the sequential elements that are controlled by the SM are determined. Clock gating may be applied to the sequential elements where the hold conditions are determined to originate from the SM and after analyzing for power savings. Other types of hold conditions may be identified without departing from the scope of the embodiments described herein.

At step S8, an enabled flip flop set and a disabled flip flop set are determined. After examining the downstream logic or otherwise determining the sequential elements that are controlled by the SM, a set of one or more flip flops (or other sequential element) that are enabled by the SM are determined from the group of controlled sequential elements that were determined in step S7. Likewise, a set of one or more flip flops that can be disabled by the SM are also determined. In other words, step S7 identifies the logic elements and step S8 identifies the control signals, or the gating conditions, in the SM which enable or disable clock transitions in the controlled flip flops. In addition to these two sets, the flip flops for which a next state cannot be determined at this stage may also be identified. For example, for undetermined flip flops, a single control signal cannot necessarily determine whether the flip flop will be enabled or disabled. Other inputs may also influence the state of the flip flop. Those undetermined flip flops should continue to be enabled when the clock-gating structures are implemented in the circuit design.

At step S9, power savings for clock gating individual flops or one or more groups of flip flops may be evaluated. Since clock gating logic itself requires power consumption, some clock gating solutions are too costly to implement when the power consumed by the clock gating circuitry outweigh the benefits realized. Accordingly, the power saved by gating the flip flops that were identified in step S8 as being disabled by the SM is evaluated against the power consumed by clock gating logic. In one embodiment, if the power saved in the one or more disabled flip flops minus the power consumed by the clock gating logic results in a positive number, the clock gating logic is implemented. In an alternative embodiment, the power savings is compared against a threshold value before clock gating is implemented for the individual flip flop or group(s) of flip flops. The threshold may be input by a designer or may be algorithmically determined based on the integrated circuit characteristics. Another factor that may be considered in evaluating a power savings solution is the on-chip area utilized by the clock gating logic. Certain power savings solutions may be implemented only when the clock gating logic area is smaller than a particular factor.

Clock gating logic for the disabled flip flop set can be generated at step S10. In one embodiment, the clock gates are generated based on the power savings evaluation of step S9, such that the most appropriate clock gating logic is implemented to save on-chip power.

Figure 3A:
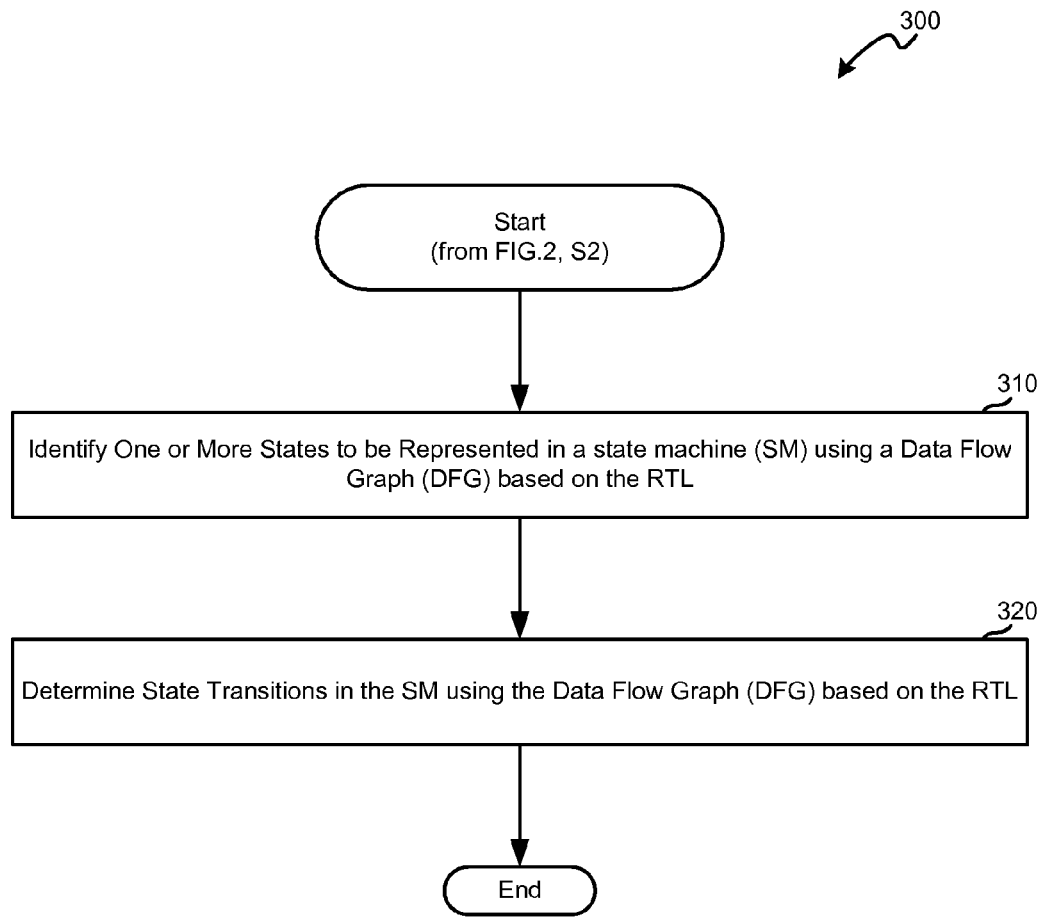
FIG. 3A is an automated process flow diagram for analyzing an RTL for determining a state machine, in accordance with an embodiment of the invention.

FIG. 3A is an automated process flow diagram 300 for analyzing an RTL for determining a state machine, in accordance with an embodiment of the invention. In one embodiment, an RTL is received. The process flow diagram 300 describes how the RTL or data flow graph (DFG) representation of the RTL can be analyzed for a state machine (SM) as recited in step S2 of FIG. 2. The presence and identity of the state machines may be retained and utilized later in the algorithm. In order to determine a state machine, one or more states are identified and one or more transitions between the states are identified.

At step 310, one or more states to be represented in a SM using a DFG based on the RTL are identified. State machines which have been defined by the designer are identified. Typically, designers write RTL code for circuit design using well known constructs for representing state machines. One example is a Verilog "case statement" which can be an indicator of a state machine. The "case statement" can be written as an always or while (true) block with a nested switch statement. For purposes of explanation, an exemplary always and switch construct is shown below:

```
always
{
switch (state)
{
   case 0: state_00( );
   break;
   case 1: state_01( );
   break;
   case 2: state_02( );
   break;
   case 3: state_03( );
   break;
   case 4: state_04( );
   break;
   default: state_error( )
   break;
}
{
```

The imported RTL is examined for this and other RTL constructs, which are translated to the DFG, to determine state machines. More particularly, states comprising the state machine are identified by analyzing the DFG for statements which can be represented by a SM. For example, always and nested switch statements may be identified in the DFG. Other types of statements and structures which are known to be represented by state machines may also be identified. The states in the SM can be determined using the identified structure in the RTL. In the case of a always and nested switch structure, each case statement is identified as being a state in the SM and the registers that represent the case statement in the IC design are identified as state registers.

In addition to identifying the states, the state transitions may be determined. At step 320, state transitions in the state machine are determined using the DFG based on the RTL. One or more transitions between the states can be identified using the RTL and/or DFG. In one embodiment, Boolean analysis may be performed to derive a state transition diagram. As previously described, each "case statement" in an always and switch construct is determined to be a state within the SM. To determine the transitions between the states, the case statements are examined. Case statements can execute various assignments which may assign different values to the state register. These assignments may constitute the transitions. In another embodiment, other types of actions which cause the state register to change are used as transitions in the SM. Identification of the state machine is complete upon determination of the states and/or transitions. In some embodiments, step 320 need not performed.

Figure 3B:
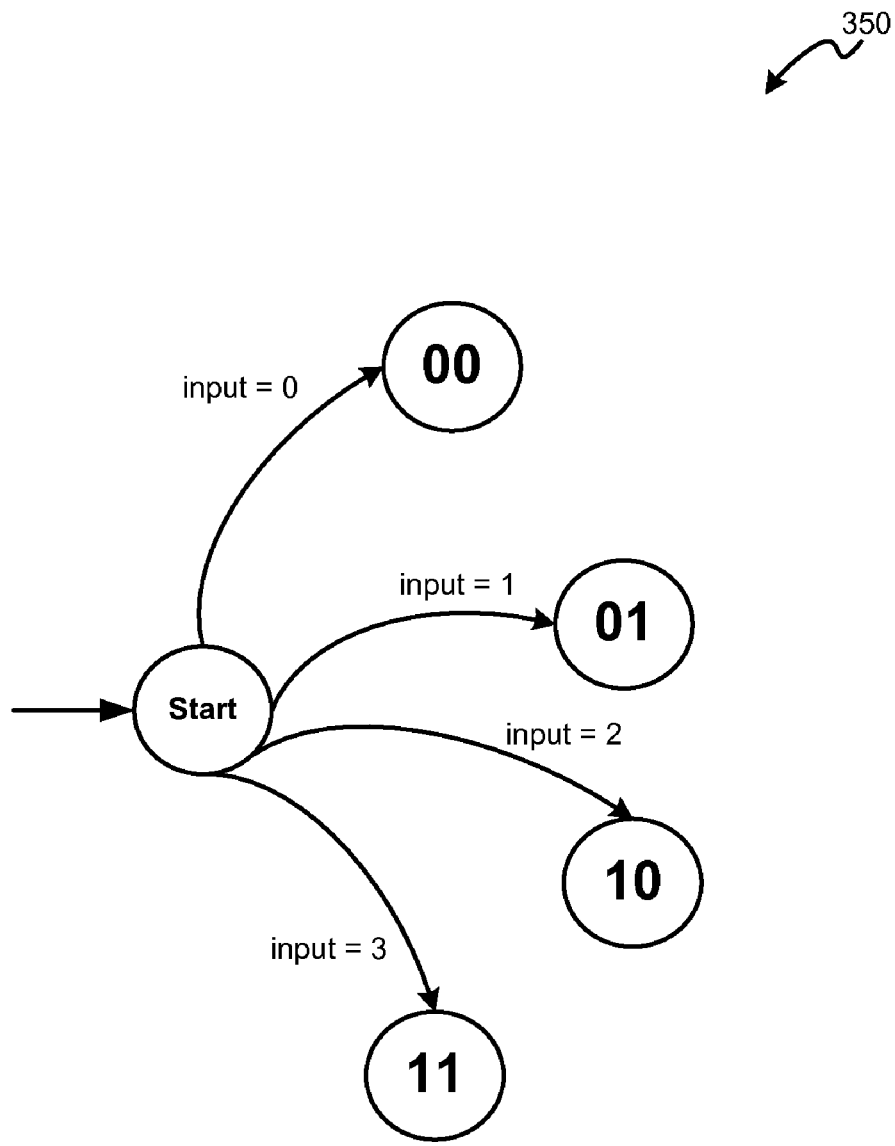
FIG. 3B is a schematic illustration of an exemplary finite state machine determined by analyzing an RTL, in accordance with an embodiment of the invention.

FIG. 3B is a schematic illustration of an exemplary finite state machine 350 determined by analyzing an RTL, in accordance with an embodiment of the invention. A Verilog "case statement" can be written as an always or while (true) block with a nested switch statement. The finite state machine (FSM) 350 may be a representation of a nested switch statement having four cases statements. Each of the four states (i.e., 00, 01, 10, and 11) in the FSM 350 represents one of the four case statements in the nested switch statement.

Figure 4A:
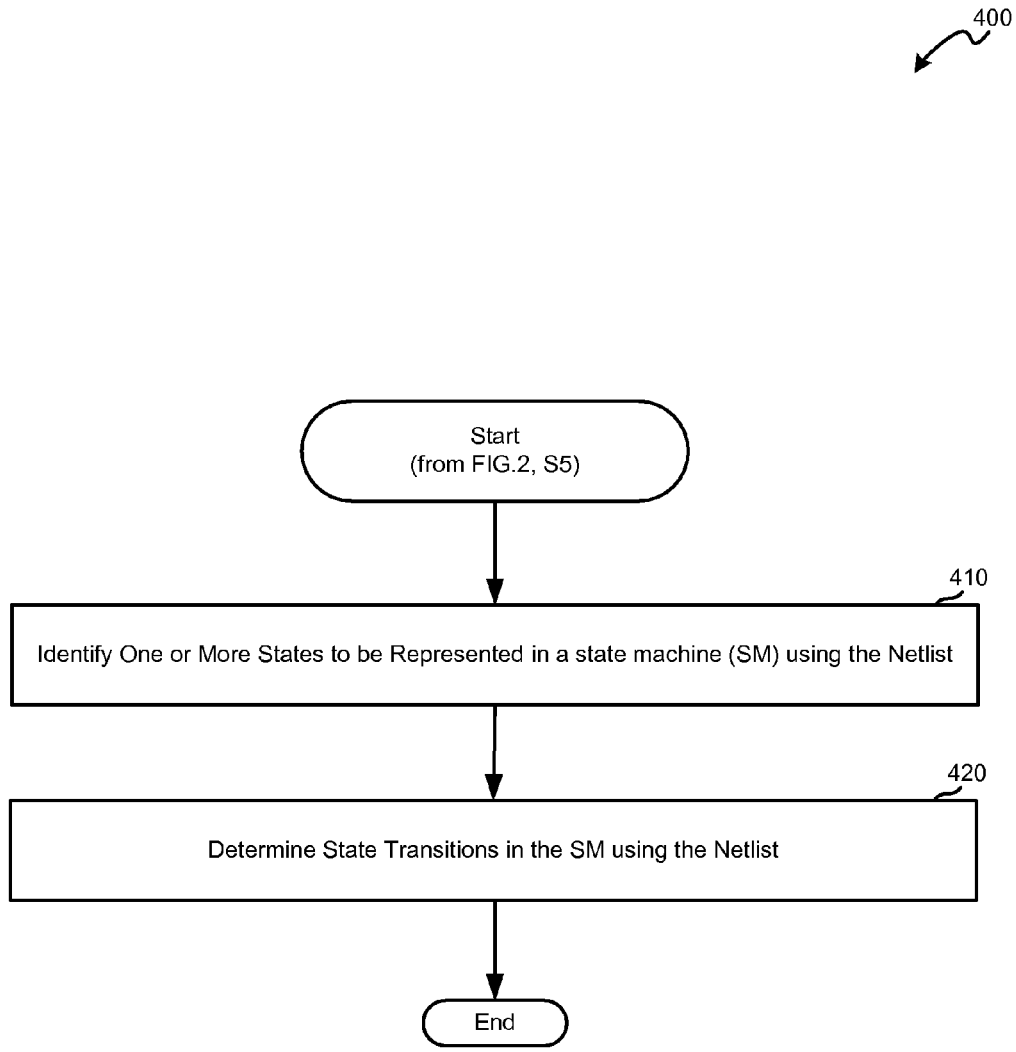
FIG. 4A is an automated process flow diagram for analyzing a netlist for determining a state machine, in accordance with an embodiment of the invention.

FIG. 4A is an automated process flow diagram 400 for analyzing a netlist for determining a state machine, in accordance with an embodiment of the invention. As previously mentioned, an alternative path for invoking power optimization of the circuit design may include receiving a netlist from an external source. The process flow diagram 400 describes how the netlist can be analyzed for a state machine (SM) as recited in step S5 of FIG. 2. In order to determine a state machine, one or more states are identified and one or more transitions between the states are identified.

At step 410, one or more states to be represented in a state machine are identified using the netlist. States comprising the state machine are identified by analyzing the netlist. State machines are typically thought of as flip flops with intervening combinational logic to control the progression from one state to the next. An IC chip may include thousands of registers in the design. It is recognized herein that state machines typically are small in size, for example, ranging anywhere from 4-16 bits. In order to identify the states and the state sequential logic (i.e., state registers), small clusters of registers are identified where the registers within the cluster connect to the other registers in the cluster. In one embodiment, each cluster is a state machine candidate. Again, the state machine presence and identity may be retained for later use in the algorithm.

In addition to identifying the states, the state transitions may be determined. At step 420, one or more state transitions in the state machine are determined using the netlist. In one embodiment, Boolean analysis may be performed to derive a state transition diagram. To do so, the initial assignments on the state registers are examined. When the circuit starts its execution, initial states are assigned to the state registers. From this starting point, these initial state values can be propagated through the combinational logic across an n-cycle path. Inputs which influence the transitions between states of the state registers are identified. For example, various side inputs may cause a change in the states of the state registers. These influencing inputs determine the state transitions in the SM. Identification of the state machine is complete upon determination of the states and/or transitions. In some embodiments, step 420 need not performed.

Figure 4B:
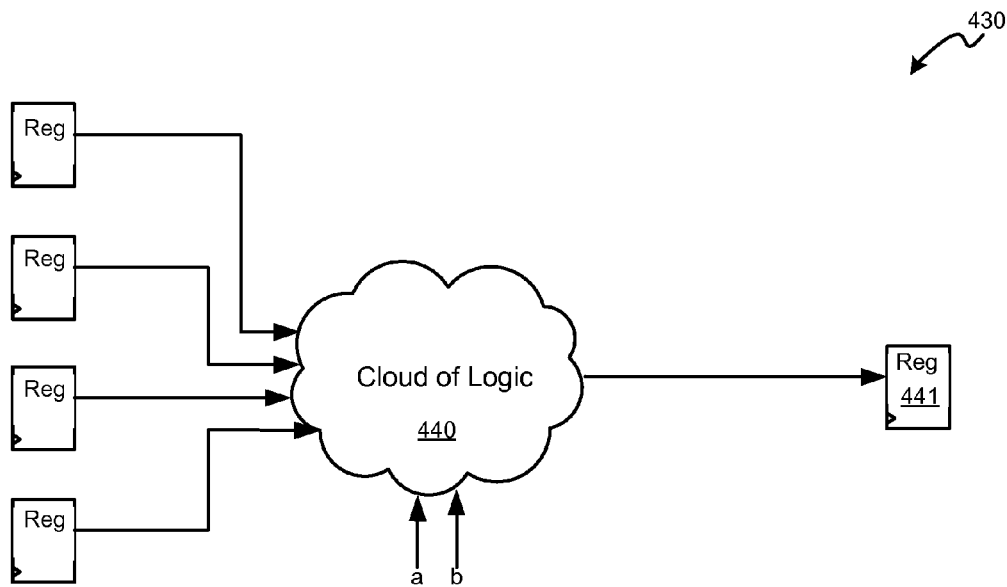
FIG. 4B is a schematic illustration of un-gated flip flop circuitry with side inputs, in accordance with an embodiment of the invention.

FIG. 4B is a schematic illustration of un-gated flip flop circuitry 430 with side inputs, in accordance with an embodiment of the invention. The circuitry 430 includes various registers which feed into a cloud of logic 440. Side inputs "a" and "b" also feed into the cloud of logic 440. The output of the logic cloud 440 is then driven into a state register 441.

As previously mentioned, an alternative path for invoking power optimization of the circuit design may include receiving a netlist from an external source and analyzing the netlist for a state machine. In order to determine a state machine, one or more states are identified, and one or more transitions between the states are identified. As shown, the side inputs "a" and "b" may influence the state of the state register 441, and as such, the states of side inputs become the state transitions in a state machine representing the circuitry 430. The state transitions are determined by enumerating on different combinations of assignments for the side inputs. In one embodiment, all possible transitions or a subset thereof are determined.

Figure 4C:
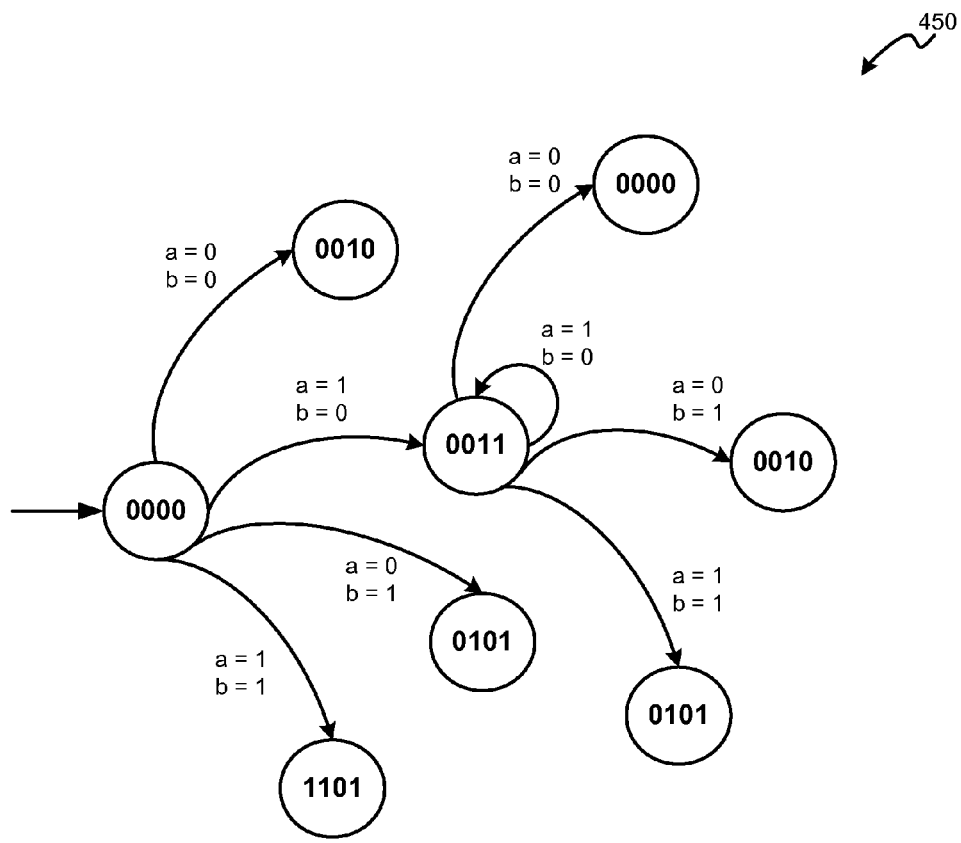
FIG. 4C is a schematic illustration of an exemplary finite state machine determined by analyzing a netlist, in accordance with an embodiment of the invention.

FIG. 4C is a schematic illustration of an exemplary finite state machine 450 determined by analyzing a netlist, in accordance with an embodiment of the invention. The finite state machine (FSM) 450 includes multiple states, and state transitions which are based on the states of the side inputs "a" and "b," as described in FIG. 4B.

Figure 5:
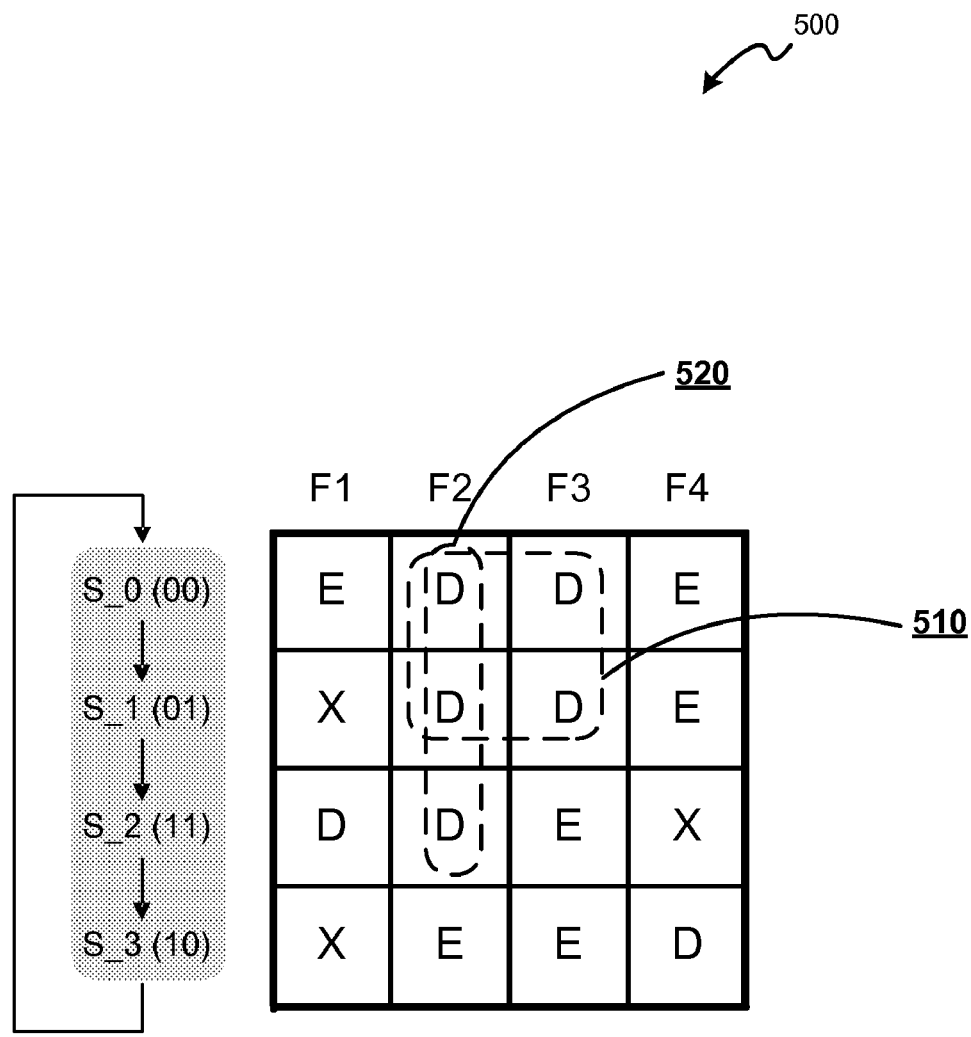
FIG. 5 is a schematic illustration of a matrix representation of a netlist, in accordance with an embodiment of the invention.

The sequential elements that are identified as disable candidates can be evaluated before a clock gating solution is implemented in the IC design. For every flip flop that can be disabled, a clock gating scenario is evaluated. A matrix representation may be used for such evaluation. FIG. 5 is a schematic illustration of a matrix 500 representation of a netlist, in accordance with an embodiment of the invention. Matrix 500 may be derived using a synthesized netlist in order to further represent the logical functionality of the disable candidates. In one embodiment, the rows of the matrix represent the states in the state machine, and the columns of the matrix represent gated sequential functions, such as flip flops. Accordingly, each row in the matrix represents a power savings function or solution.

A flip flop can retain its previous state, change states, or be indeterminate. If a flip flop retains its previous state then the flip flop can be disabled, since no calculation is required. If a flip flop changes state then it should be enabled. If it is indeterminate as to the next state of the flip flop then it should continue to be enabled. These conditions can be summarized with the following notation, as shown in FIG. 5:

D—The flip flop can be Disabled since it will continue to hold its previous state.

E—The flip flop will change states so it should be Enabled.

X—The next state of a flip flop is unknown and therefore is denoted with an X.

Matrix 500 includes rows which represent the states in the state machine. Four states and their corresponding transitions are depicted in matrix 500. State S_0 (00) has a transition path to state S_1 (01), state S_1 (01) has a transition path to state S_2 (11), state S_2 (11) has a transition path to state S_3 (10), and state S_3 (10) has a transition path to state S_0 (00). Two bits are required to implement these four states, which are, 00 to 01 to 11 to 10 and reverting to 00.

Matrix 500 also represents four flip flops: F1, F2, F3, and F4. Each of the four flip flops are associated with a condition, such as E, D, and X, which corresponds to a state. For example, at state S_0 (00), the flip flops F1 and F4 are associated with the condition E (i.e., Enable), and flip flop F2 is associated with the condition D (i.e., Disable). Likewise, at state S_0 (00), the flip flop F3 is also associated with the condition D (i.e., Disable).

New disable candidates may be generated and evaluated for power saving potential. In one embodiment, additional clock gate disable candidates are determined, for example, by combining the previously identified disable candidates. In doing so, new disable candidates may be generated. The use of matrixes for purposes of evaluation and for deriving new disable candidates is described in U.S. patent application Ser. No. 12/128,554, entitled "A Method for Automatic Clock Gating to Save Power," filed May 28, 2008.

An exemplary combination of states and flip flops is new disable candidate 510. As shown, at states S_1 (01) and S_0 (00), the flip flops F2 and F3 are associated with the condition D (i.e., Disable). Since both flip flops F2 and F3 can be disabled (D) for both states S_0 and S_1, clock gating logic can be implemented to disable these flip flops for two states out of the four total states, which amounts to half of the clock periods. There may be tradeoff involved in identifying the enable for maximal power savings. In one embodiment, new disable candidates are determined by combinations of states that have overlapping or common flip flops that can be gated. In other embodiments, all possible combinations or a subset thereof are determined and evaluated for power savings. Another exemplary combination of states and flip flops is new disable candidate 520, where three states S_0, S_1, and S_2 can be combined together to gate flip flop F2. The new and original disable candidates may then be evaluated for power savings.

The concepts described herein can be applied to power gating in addition to clock gating. For example, an enable signal which is fed into a clock gating circuitry for gating multiple sequential elements may be extended to gate combinational logic which feeds into the gated sequential elements when the value produced by the combination logic is wasted. The value of the combinational logic may be wasted when the combinational logic feeds exclusively into the gated sequential elements, and no others, and the computational output of the combinational logic is not used. Power gating of combinational logic is described in more detail with regard to FIG. 11.

Figure 6A:
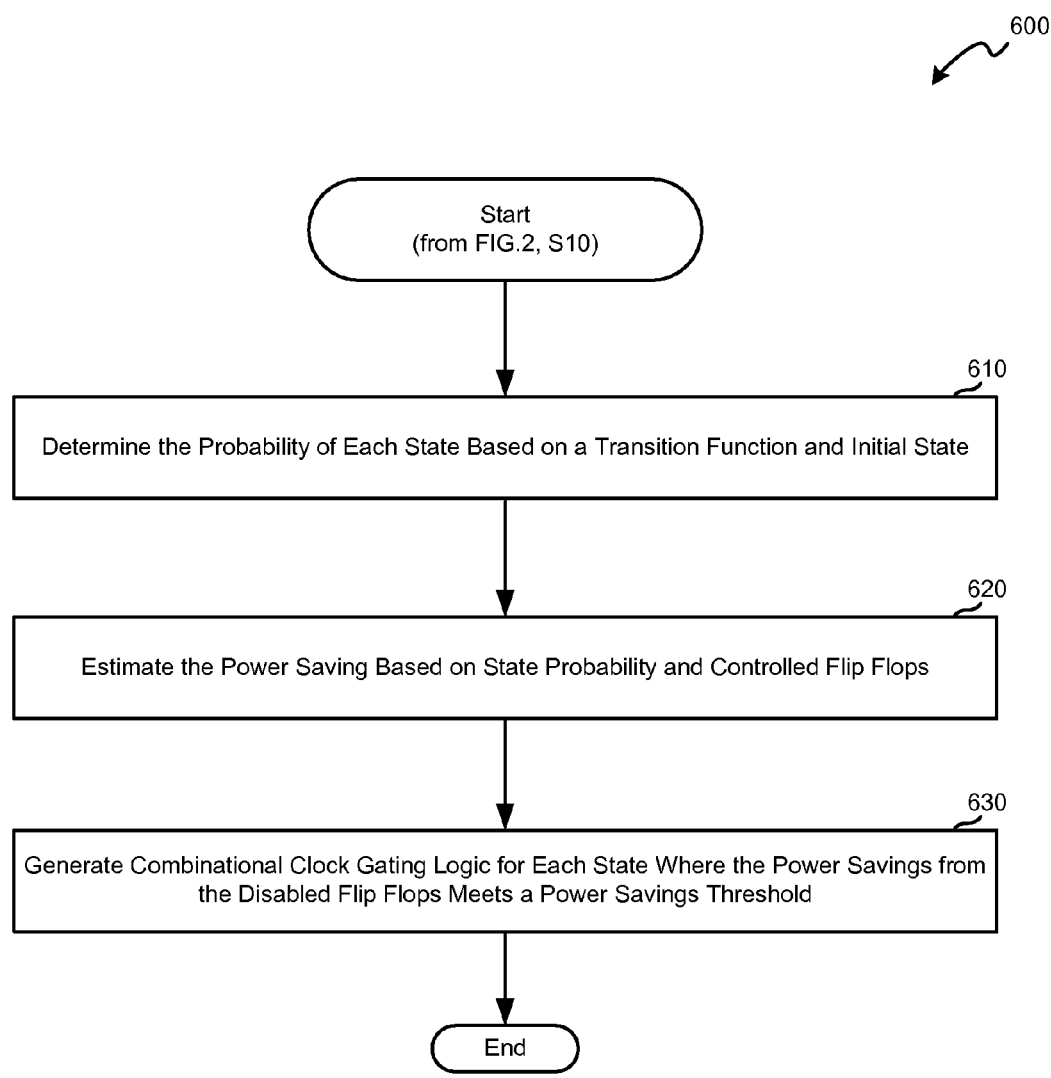
FIG. 6A is an automated process flow diagram for generating combinational clock gating logic for a non-linear state machine, in accordance with an embodiment of the invention.

As previously discussed, for every flip flop that can be disabled, a clock gating scenario is evaluated for power savings. An estimation of a probability of each state in the state machine may be used for such evaluation. FIG. 6A is an automated process flow diagram for generating combinational clock gating logic for a non-linear state machine, in accordance with an embodiment of the invention. At step 610, the probability of each state based on a transition function and an initial state is determined. Moreover, the probability of each next state may also be determined from the transition function. A power savings calculation may take into account the percentage of time that a flip flop may be gated. Accordingly, a determination of the probability of each state in a state machine (SM) can then be used for evaluation of power savings. For linear transitions in a SM, the probability for each state is simplistic. For example, with a four-state SM, if it is determined that the flip flop will be gated in two out of the four states, the probability that the flip flop is shutdown is 50%. Difficulty arises in the context of complex state machines. Accordingly, an estimation of state probabilities is determined.

The probabilities or estimations thereof can be determined from the transition function which dictates the conditions under which a transition from one state to another can occur. Using the transition function and an initial state, the input combinations can be computed and the percentage of the total combinations in which a transition occurs from one state to another can be ascertained. It should be recognized that techniques for computing probabilities for state transitions is well known.

At step 620, the power savings based on the state probability and controlled flip flops is estimated. The probabilities determined at step 610 can be used, for example in a matrix form, as described in FIG. 5, whereby the columns are related to the controlled flip flops and the rows of the matrix are associated with the probability values. Probabilities can translate to toggle rates or signal transition rates, which can then be used to measure the power consumption of sequential elements. At step 630, combinational clock gating logic for each state is generated where the power savings from the disabled flip flops meets a power savings threshold. As used herein, combinational clock gating refers clock gating across a single clock cycle. The clock gate and the conditions for the clock gate are inserted in the IC design. In alternative embodiments the threshold value can be determined similarly to the methods used in step S9 of FIG. 2.

Figure 6B:
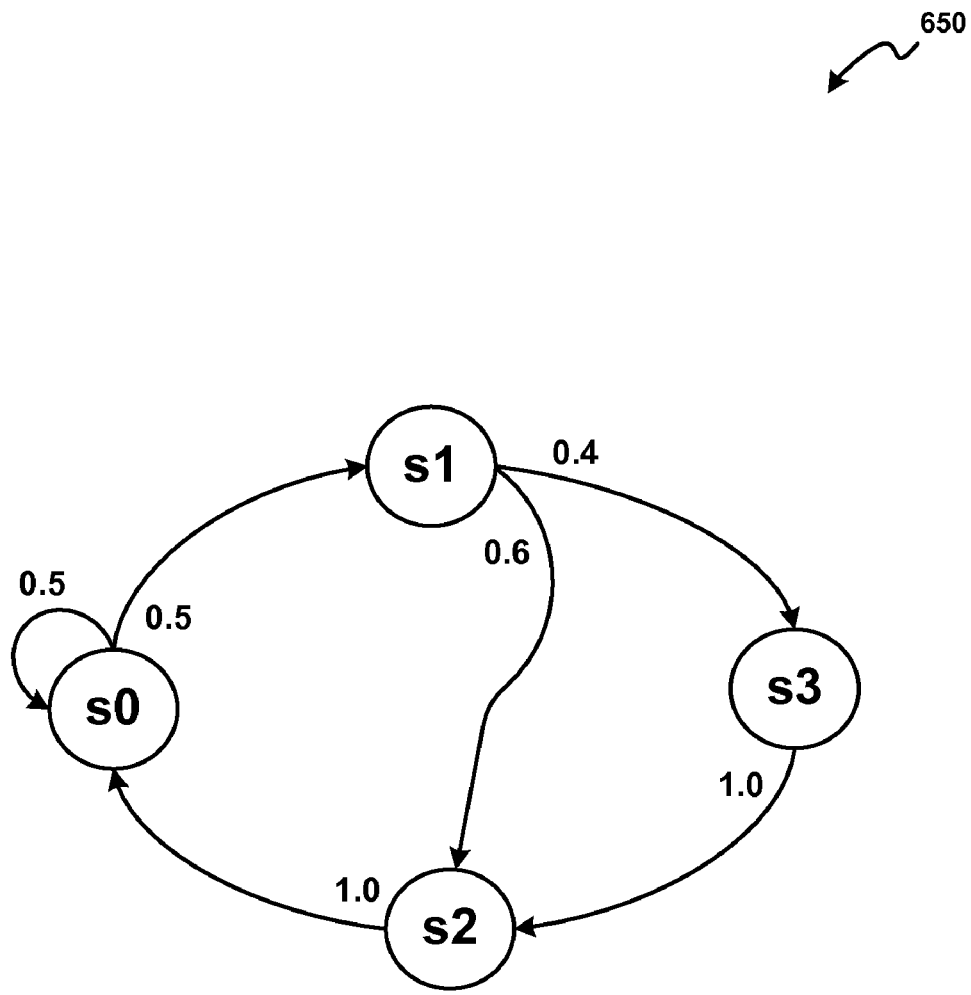
FIG. 6B is an illustration of a non-linear state machine representing a circuit design, in accordance with an embodiment of the invention.

FIG. 6B is an illustration of a non-linear state machine 650 representing a circuit design, in accordance with an embodiment. Probabilities of transitions from one state to another can be used to evaluate the power savings of clock gating solutions. Probabilities of a particular state in the non-linear state machine 650 are more difficult to determine than for state machines with linear transform functions. As shown, state s0 has a 50% probability of proceeding to state s1 and a 50% probability of remaining at s0. State s1 has a 40% probability of proceeding to s3 and a 60% probability of proceeding to s3. Due to the branching possibilities in the state diagram, determining the flip flop set to disable and calculating the resulting power savings is more complex in non-linear state machines.

By way of example, the controlled flip flops in FIG. 5 show that F2 and F3 can be disabled for states S_0 and S_1. For the non-linear state machine 650, if state S_0 is encountered, the next state will either again be S_0 or proceed to S_1. When in state S_0, either the transition to state S_1 or remaining in state S_0 will lead to a 100% probability that the resulting state will be disabled. When such conditions are encountered, one embodiment may implement clock gating to save power.

Figure 7:
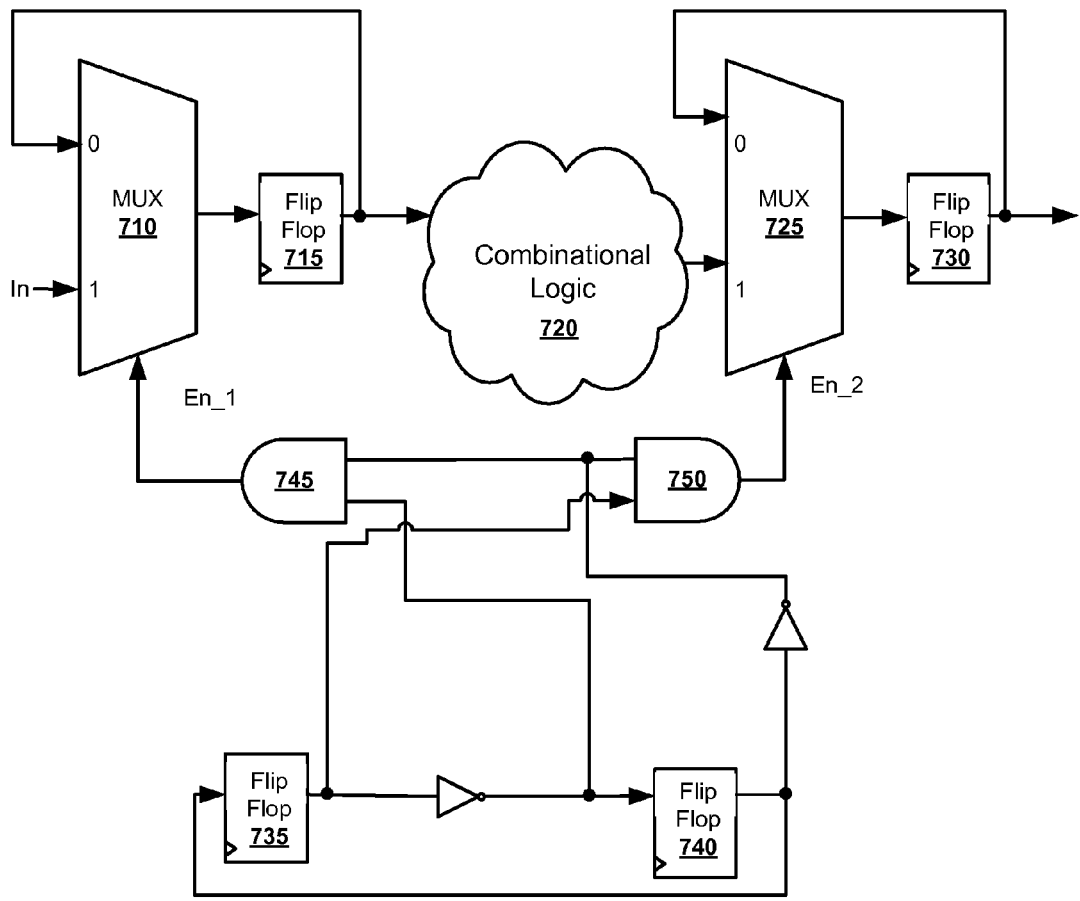
FIG. 7 is a schematic illustration of an exemplary flip flop circuitry with multi-cycle paths, in accordance with an embodiment of the invention.

FIG. 7 is a schematic illustration of an exemplary flip flop circuitry 700 with multi-cycle paths, in accordance with an embodiment. A multi-cycle path in a sequential circuit is a path that does not have to propagate signals in a single clock cycle. An n-cycle path is a path that is permitted to use n clock cycles to propagate signals, where n is an integer. The flip flop circuitry 700 includes a multiplexer 710 which feeds into flip flop 715, the output of which feeds back into an input of multiplexer 710 and feeds into combinational logic 720. The output of the combinational logic 720 feeds into an input of multiplexer 725, which in turn, feeds flip flop 730. The output of flip flop 730 is driven back into an input of the multiplexer 725. The circuitry 700 also includes flip flops 735 and 740. The output of flip flop 735 is driven into an input of AND gate 750. An inverter gate is applied to this signal and is driven into an input of the AND gate 745 and is also driven into the flip flop 740. The output of flip flop 740 is fed back as an input to the flip flop 735. An inverter gate is applied to this signal and is driven into AND gates 745 and 750. The output of the AND gate 745 is enable signal En_1 which is fed into the enable input of the multiplexer 710. The output of the AND gate 750 is enable signal En_2 which is fed into the enable input of the multiplexer 725.

Flip flop 715 and flip flop 730 represent the multi-cycle paths. Flip flop 735 and flip flop 740 represent a finite state machine which coordinates flip flop 715 and flip flop 730 such that when flip flop 715 produces a value, flip flop 730 updates n-clock cycles later. Many techniques may be used to identify controlled sequential elements (e.g., flip flop 715 and flip flop 730) in multi-cycle paths.

Figure 8A:
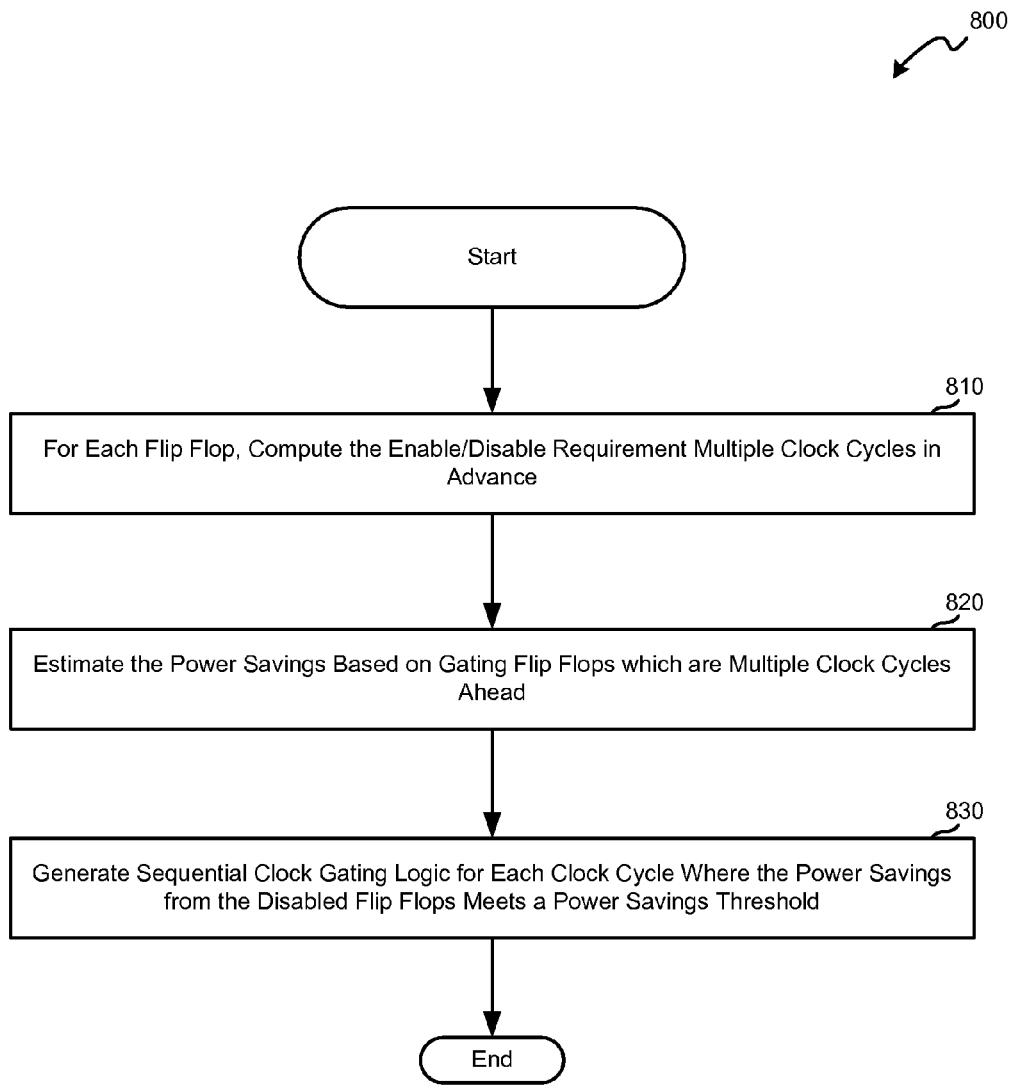
FIG. 8A is an automated process flow diagram for generating sequential clock gating logic for multi-cycle paths, in accordance with an embodiment of the invention.

The concepts described herein can be applied to clock gating across multiple clock periods. Using the determined state machine, a next state can be anticipated and information from the state machine can be used to predict a state which is n-clock cycles in the future. This forward-looking approach can use the predicted state to maximize power savings. FIG. 8A is an automated process flow diagram for generating sequential clock gating logic for multi-cycle paths, in accordance with an embodiment of the invention. As used herein, sequential clock gating refers to clock gating across multiple clock cycles.

At step 810, the enable/disable requirements for each flip flop are determined. The determination is considered over multiple cycles. Many techniques may be used to identify the enable/disable requirements of controlled sequential elements in multi-cycle paths. At step 820, the power savings are estimated for clock gating flip flops which are multiple cycles ahead of time. At step 830, sequential clock gating is generated for each clock cycle where the power savings from the disabled flip flops meet a power savings threshold. In alternative embodiments the threshold value can be determined similarly to the methods used in step S9 of FIG. 2.

Various embodiments of the clock gating described herein provide for the optimization of power consumption for multi-cycle paths, false paths, and other types of logic circuits. By examining state machines and the downstream logic, clock gating can be implemented to save power.

Figure 8B:
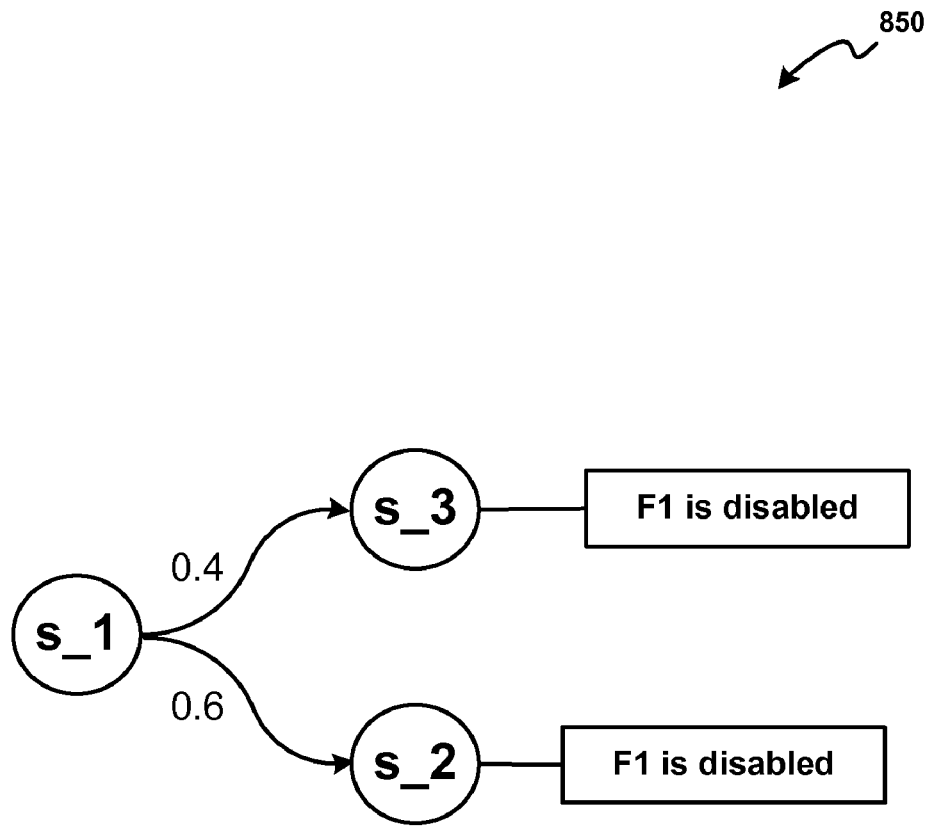
FIG. 8B is a partial illustration of a FSM representing a circuit design for determining disable candidates in a multi-cycle path, in accordance with an embodiment of the invention.

FIG. 8B is a partial illustration of a FSM 850 representing a circuit design for determining disable candidates in a multi-cycle path, in accordance with an embodiment. State machines, such as FSM 850, may be used to determine whether clock gating could be implemented in a future cycle of the IC design. FSM 850 includes three distinct states: States s_1, s_2, and s_3. Assume flip flop F1 is disabled when s_2 and s_3 are achieved. Further assume that state s_1 has a transition path to s_2 or s_3, and no other states. When state s_1 is achieved, it is known by 100% certainty that in the next clock cycle flip flop F1 is disabled, regardless of whether state s_2 or s_3 is achieved. As such, s_1 can be used as a condition to predict in the next clock cycle that flip flop F1 will be gated.

Clock gating can be implemented for F1. In particular, a condition based on s_1 may be generated and a flip flop may be inserted in the current cycle to defer the condition to the next clock cycle. F1 can then be gated in the next clock cycle. Since the additional flip flop consumes power, a power savings analysis may be performed prior to insertion into the IC design.

Figure 9:
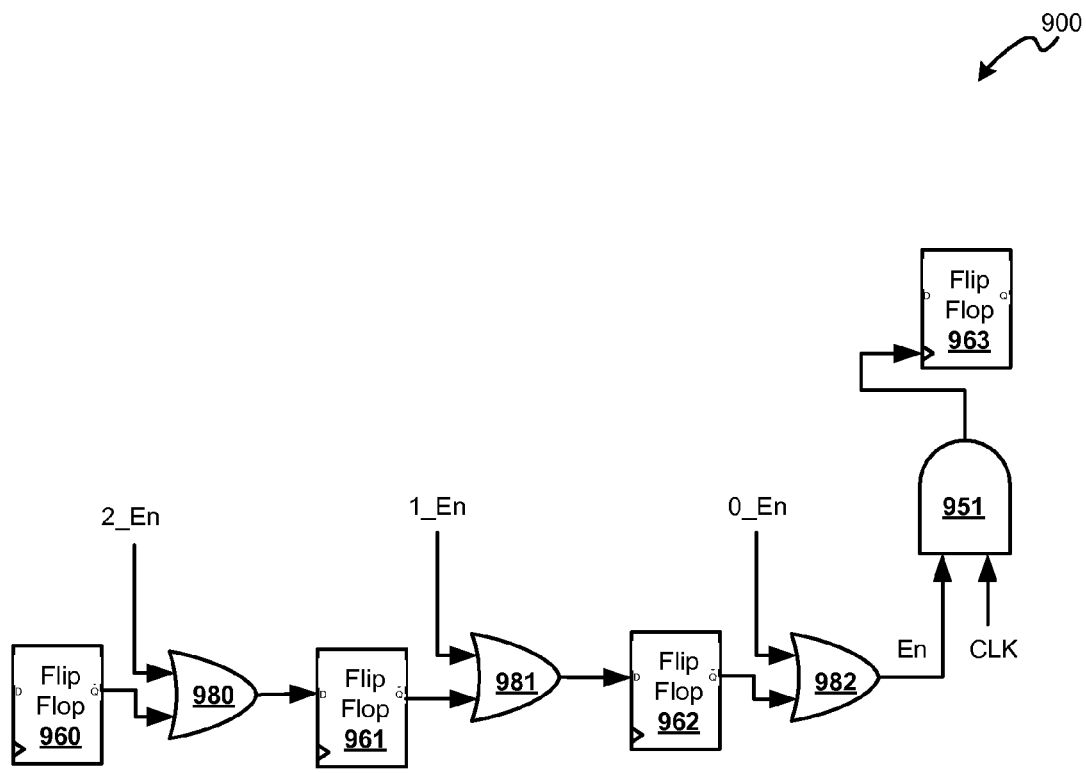
FIG. 9 is a schematic illustration of a clock-gated flip flop circuitry with a multi-cycle path, in accordance with an embodiment of the invention.

FIG. 9 is a schematic illustration of a clock-gated flip flop circuitry 900 with a multi-cycle path, in accordance with an embodiment. Clock gating can be implemented at various pipelined cycles and in multiple time frames. States of flip flops can be predicted multiple clock cycles in the future. When flip flops are identified as being gated in multiple clock periods in the future, the clock gate conditions are determined. Additional flip flops may be inserted into the circuit to defer this gating condition into the relevant future clock cycle. The deferred gating condition signal may be used to gate the target flip flop.

These additional flip flops may be inserted across multiple time frames such that clock gate enable signals may come from different time frames from the past. The clock gate enable signals from a past time can be used to gate sequential logic in a current time frame. Circuitry 900 includes flip flop 960, flip flop 961, flip flop 962, and flip flop 963. The circuitry 900 also includes OR gates 980, 981, and 982. A clock gate circuitry is represented by AND gate 951 with inputs of clock CLK and enable En. If the clock needs to be enabled in the current cycle, 0_En can be set high. If a clock needs to be enabled one cycle in the future, 1_En can be set high. If a clock needs to be enabled two cycles in the future, 2_En can be set high. The chain of clock gate enable signals may be used to gate the flip flop 963 and/or a larger cluster of flip flops in the appropriate time period. In the case where 0_En, 1_En, and 2_En have been low in the appropriate cycles, then clock gating occurs and flip flop 963 is not clocked. It should be noted that clock connections are assumed for flip flops 960, 961, and 962 but are not shown for simplicity in the figure.

Figure 10:
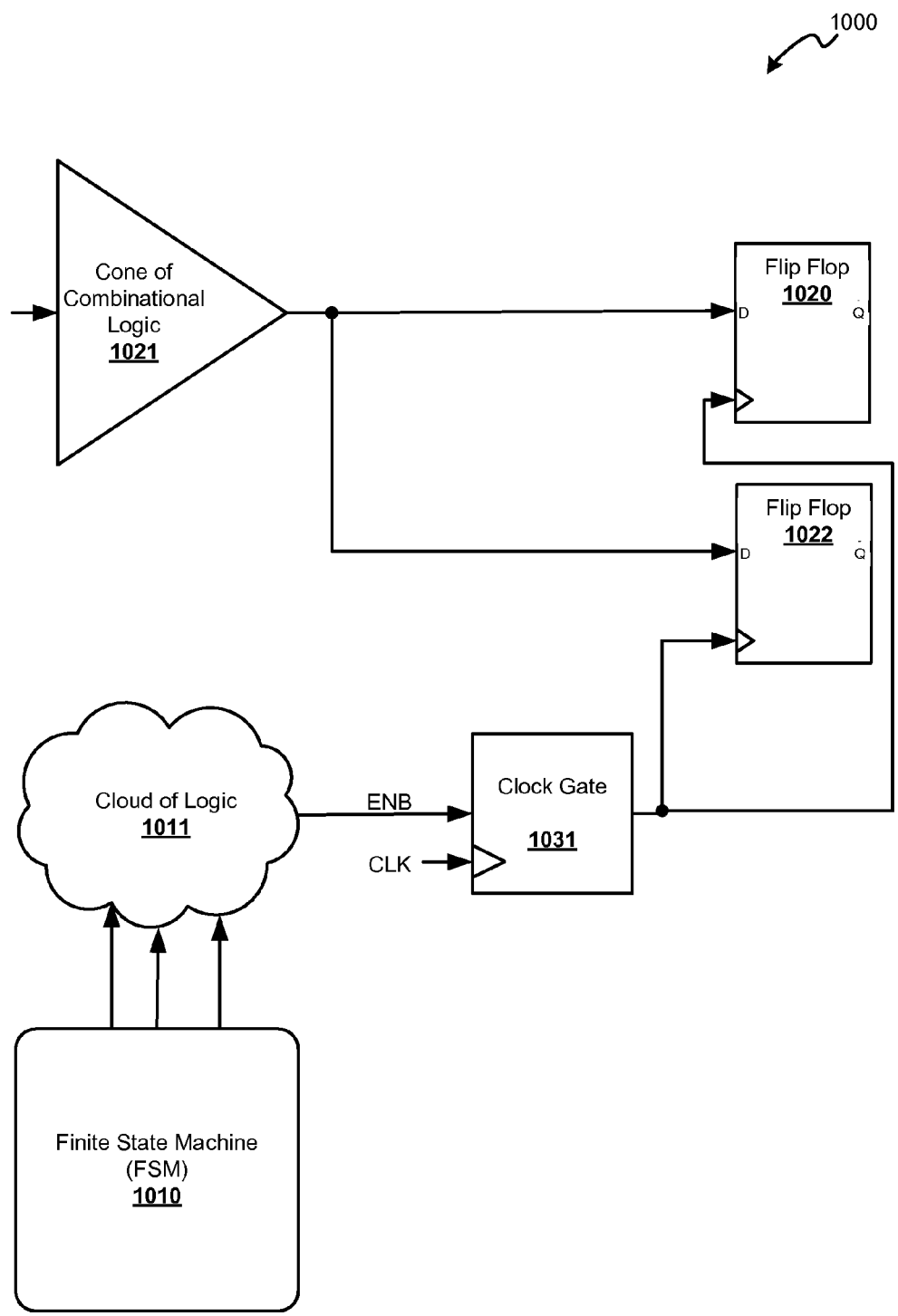
FIG. 10 is a schematic illustration of a clock-gated circuit design which includes a clock gate, driven by a finite state machine, which blocks unnecessary sequential element clocking, in accordance with an embodiment of the invention.

FIG. 10 is a schematic illustration of a clock-gated circuit design 1000 which includes a clock gate, driven by a finite state machine, which blocks unnecessary sequential element clocking, in accordance with an embodiment of the invention. The circuit design 1000 includes a cone of combinational logic 1021 which feeds into the D input pins of flip flops 1020 and 1022. A finite state machine (FSM) 1010 is determined as previously described, using either an RTL or a netlist. The FSM 1010 feeds into cloud of logic 1011 which drives an enable signal ENB into an input of clock gate 1031. A clock node of the clock gate 1031 takes a clock source CLK as an input. The output signal of the clock gate 1031 is driven into the clock nodes of the flip flop 1020 and the flip flop 1022, thereby gating the respective sequential elements. This design uses the enable signal ENB as a clock gate enable. If the enable signal ENB is at 1, the clock signal is propagated to the flip flop 1020 and flip flop 1022 otherwise the clock signal is blocked. Thus, the FSM 1010 controls the gating of the sequential elements (i.e., flip flop 1020 and flip flop 1022) and thereby avoids unnecessary clocking of flip flop 1020 and flip flop 1022 during clock cycles when stored data is to remain unchanged.

Figure 11:
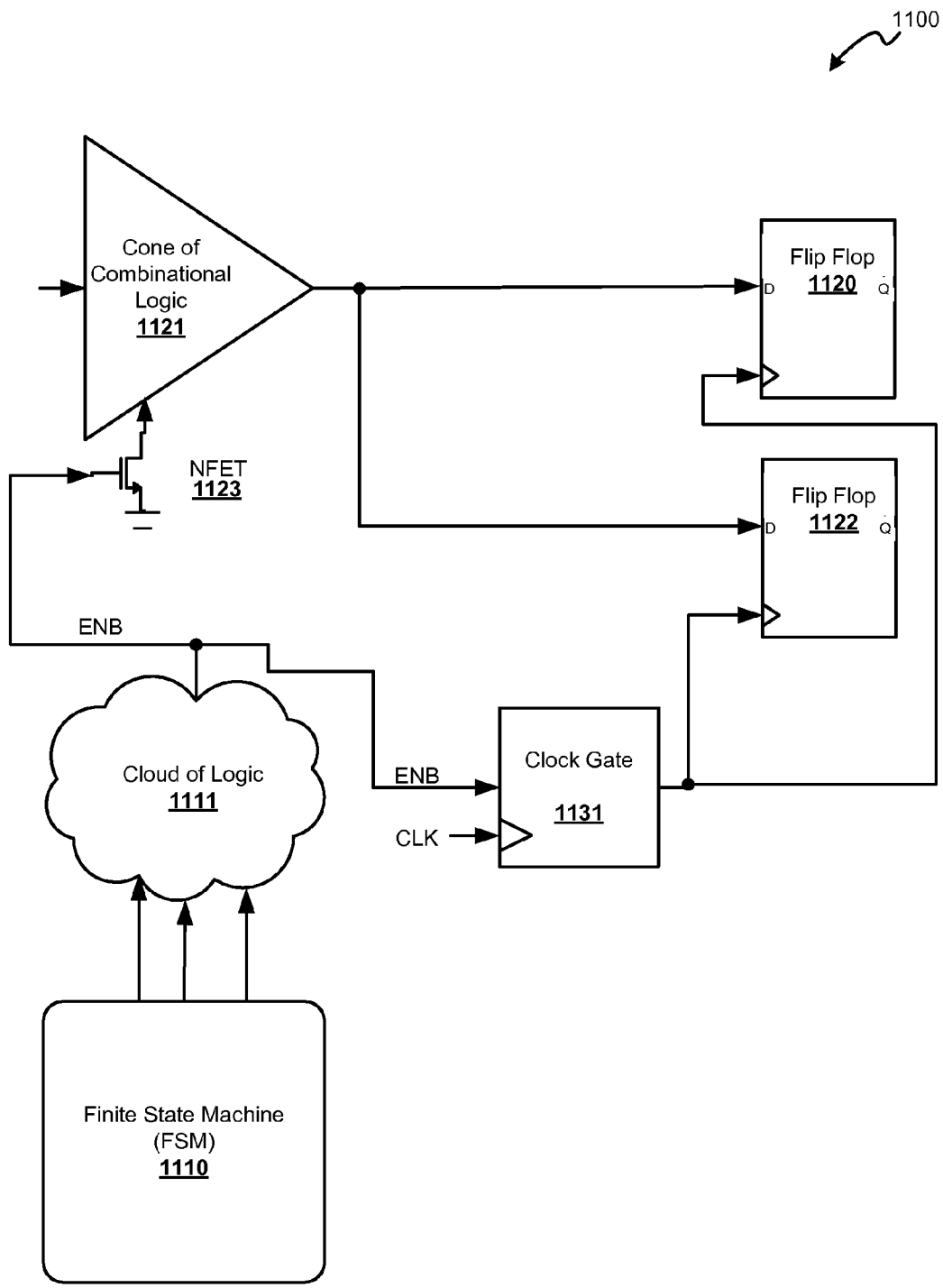
FIG. 11 is a schematic illustration of a power-gated circuit design which includes power-gating capability driven by a finite state machine that is incorporated within a partial circuit, in accordance with an embodiment of the invention.

The concepts described herein can be applied to power gating in addition to clock gating. FIG. 11 is a schematic illustration of a power-gated circuit design 1100 which includes power-gating capability driven by a finite state machine that is incorporated within a partial circuit, in accordance with an embodiment of the invention. The circuit design 1100 includes cone of combinational logic 1121 which feeds into the D input pins of flip flops 1120 and 1122. A finite state machine (FSM) 1110 is determined, as previously described, using either an RTL or a netlist. The FSM 1110 feeds into cloud of logic 1111 which drives an enable signal ENB into an input of clock gate 1131. A clock node of the clock gate 1131 takes a clock source CLK as an input. The output signal of the clock gate 1131 is driven into the clock nodes of the flip flop 1120 and the flip flop 1122, thereby gating the respective sequential elements.

In addition to clock gating the sequential elements, cone of combinational logic 1121 is power-gated with a transistor, such as NFET 1123. Cloud of logic 1111 also drives the enable signal ENB into a power-down circuitry, i.e., the transistor NFET 1123, thereby gating cone of combinational logic 1121. Thus, FSM 1110 controls the gating of the combinational element (i.e., cone of combinational logic 1121).

The transistor NFET 1123 as shown in FIG. 11 is exemplary in nature and is included for purposes of explanation. It should be recognized that various implementations of power-down may be used, including, but not limited to an NFET and/or a PFET, MTCMOS, or more a complex type of power down circuitry.

Cone of combinational logic 1121 is power-gated by extending the enable signal which is fed into the clock gate 1131. In one embodiment, the cone of combinational logic 1121 is power-gated when the value of the combinational logic may be wasted or not used. As shown, the cone of combinational logic 1121 feeds exclusively into the gated flip flops 1120 and 1122. Whenever the flip flops 1120 and 1122 are gated, the computation performed in the combinational logic is wasted because the value produced is not used by the flip flops that the logic feeds. In this and other situations where the output of combinational logic is wasted, power-down circuitry may be inserted to shut down power to the combinational logic. In another embodiment, power-gating or clock-gating may be implemented, such that clock-gating logic is not inserted in the circuit design 1100 and the enable single ENB is driven to the power-down circuitry without also being driven to the clock gate 1131.

Figure 12:
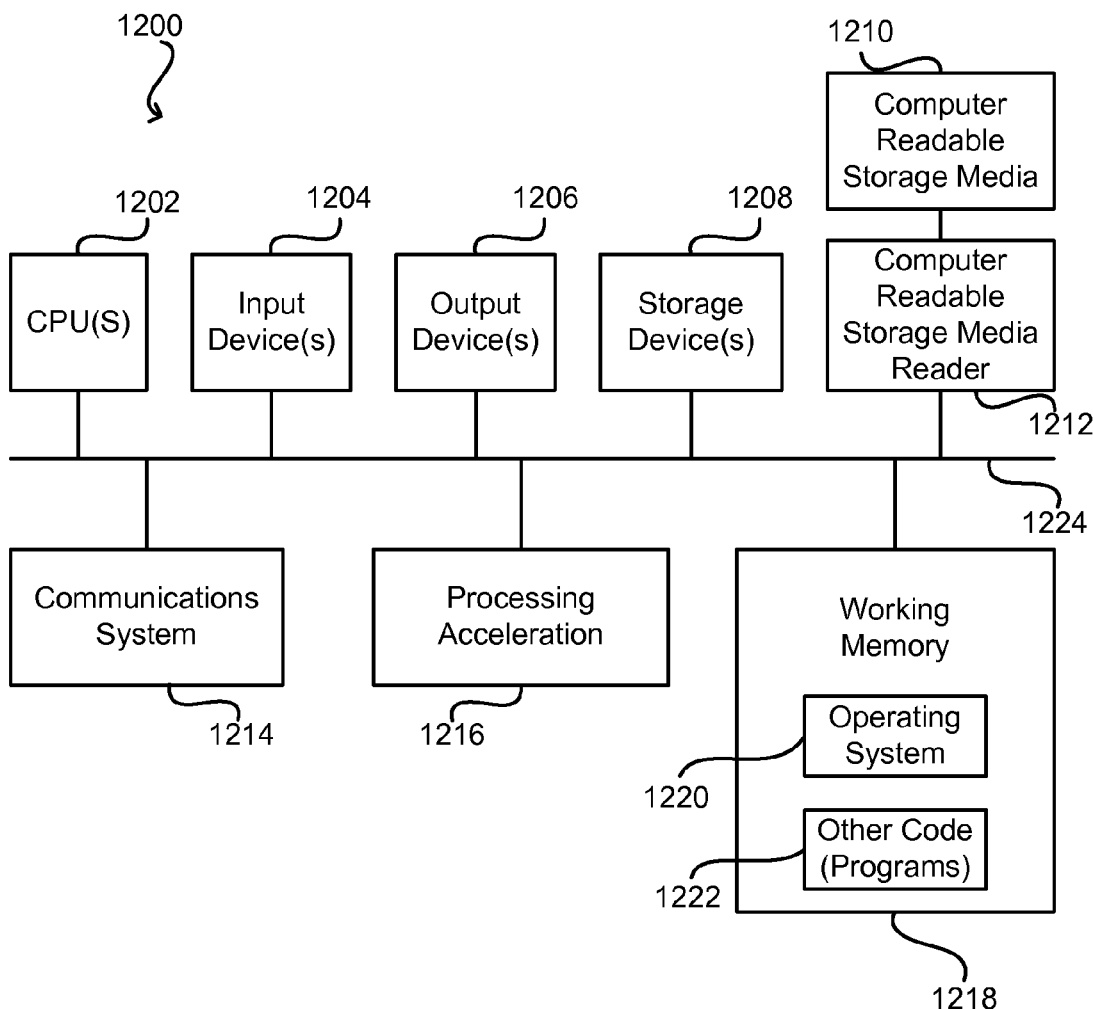
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. The computer system 1200 is shown comprising hardware elements that may be electrically coupled via a bus 1224. The hardware elements may include one or more central processing units (CPUs) 1202, one or more input devices 1204 (e.g., a mouse, a keyboard, etc.), and one or more output devices 1206 (e.g., a display device, a printer, etc.). The computer system 1200 may also include one or more storage devices 1208. By way of example, the storage device(s) 1208 can include devices such as disk drives, optical storage devices, solid-state storage device such as a random access memory ("RAM") and/or a read-only memory ("ROM"), which can be programmable, flash-updateable and/or the like.

The computer system 1200 may additionally include a computer-readable storage media reader 1212, a communications system 1214 (e.g., a modem, a network card (wireless or wired), an infra-red communication device, etc.), and working memory 1218, which may include RAM and ROM devices as described above. In some embodiments, the computer system 1200 may also include a processing acceleration unit 1216, which can include a digital signal processor DSP, a special-purpose processor, and/or the like.

The computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing computer-readable information. The communications system 1214 may permit data to be exchanged with the network and/or any other computer described above with respect to the system 1200.

The computer system 1200 may also comprise software elements, shown as being currently located within a working memory 1218, including an operating system 1220 and/or other code 1222, such as an application program (which may be a client application, Web browser, mid-tier application, RDBMS, etc.). It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. In addition, the technique and system of the present invention is suitable for use with a wide variety of electronic design automation tools and methodologies. The scope of the invention should, therefore, be determined not with reference to the above description, but instead should be determined with reference to the pending claims along with their full scope or equivalents.

What is claimed is:

1. A power optimization method of deriving gated circuitry in an integrated circuit (IC) design, the method comprising:
identifying, with one or more processors associated with one or more computer systems, one or more state machines in a representation of the IC design;
generating, with the one or more processors associated with one or more computer systems, a synthesized netlist of the IC design based on the representation of the IC design;
identifying downstream logic of at least one state machine in the one or more state machines;
analyzing, with the one or more processors associated with one or more computer systems, the downstream logic;
determining, with the one or more processors associated with one or more computer systems, one or more candidate blocks in the downstream logic of the synthesized netlist which are capable of being disabled;
identifying, with the one or more processors associated with one or more computer systems, a sequential element in the one or more candidate blocks based on one or more states in the at least one state machine, wherein the one or more candidate blocks are controlled by the at least one state machine;
identifying, with the one or more processors associated with one or more computer systems, a gating condition in the at least one state machine that inhibits a clock transition in the sequential element;
inserting, with the one or more processors associated with one or more computer systems, a gating circuit in the IC design for gating the one or more candidate blocks in the downstream logic.

2. The method according to claim 1, wherein the downstream logic includes a multi-cycle path.

3. The method according to claim 1, wherein the downstream logic includes a false path.

4. The method according to claim 1, wherein the downstream logic includes a plurality of Multi-Threshold CMOS (MTCMOS) logic gates, and wherein the gating circuit is capable of disabling at least one of the MTCMOS logic gates to save power.

5. The method according to claim 1, wherein analysis of the downstream logic is performed for a plurality of future clock cycles in advance of a present clock cycle, and wherein the sequential element is identified as being controlled in a future clock cycle of the plurality of future clock cycles.

6. The method according to claim 5, wherein the gating condition of the at least one state machine for the present clock cycle inhibits a clock transition in the sequential element in the future clock cycle.

7. The method according to claim 1, wherein the gating circuit includes at least one of a clock-gating logic and a power-gating logic.

8. The method according to claim 1, further comprising:
determining, with the one or more processors associated with one or more computer systems, a plurality of clock-gating arrangements, whereby each clock-gating arrangement controls a clock transition in a sequential element of at least one of the one or more candidate blocks;
evaluating, with the one or more processors associated with one or more computer systems, a power savings value of each of the plurality of clock-gating arrangements; and
selecting, with the one or more processors associated with one or more computer systems, an optimal clock-gating arrangement from the plurality of clock-gating arrangements based on the evaluation of the power savings values, wherein the inserted gating circuit implements the optimal clock-gating arrangement.

9. A computer program product stored on a non-transitory computer-readable medium for deriving gated circuitry in an integrated circuit (IC) design, the computer program product comprising:
code for identifying one or more state machines in a representation of the IC design;
code for generating a synthesized netlist of the IC design based on the representation of the IC design;
code for identifying downstream logic of at least one state machine in the one or more state machines;
code for analyzing the downstream logic;
code for determining one or more candidate blocks in the downstream logic of the synthesized netlist which are capable of being disabled;
code for identifying a sequential element in the one or more candidate blocks based on one or more states in the at least one state machine, wherein the one or more candidate blocks are controlled by the at least one state machine;
code for identifying a gating condition in the at least one state machine that inhibits a clock transition in the sequential element; and
code for inserting a gating circuit in the IC design for gating the one or more candidate blocks in the downstream logic.

10. The computer program product according to claim 9, wherein the downstream logic includes a multi-cycle path.

11. The computer program product according to claim 9, wherein the downstream logic includes a false path.

12. The computer program product according to claim 9, wherein the downstream logic includes a plurality of Multi-Threshold CMOS (MTCMOS) logic gates, and wherein the gating circuit is capable of disabling at least one of the MTCMOS logic gates to save power.

13. The computer program product according to claim 9, wherein analysis of the downstream logic is performed for a plurality of future clock cycles in advance of a present clock cycle, and wherein the sequential element is identified as being controlled in a future clock cycle of the plurality of future clock cycles.

14. The computer program product according to claim 13, wherein the gating condition of the at least one state machine for the present clock cycle inhibits a clock transition in the sequential element in the future clock cycle.

15. The computer program product according to claim 9, wherein the gating circuit includes at least one of a clock-gating logic and a power-gating logic.

16. The computer program product according to claim 9, further comprising:
   code for determining a plurality of clock-gating arrangements, whereby each clock-gating arrangement controls a clock transition in a sequential element of at least one of the one or more candidate blocks;
   code for evaluating a power savings value of each of the plurality of clock-gating arrangements; and
   code for selecting an optimal clock-gating arrangement from the plurality of clock-gating arrangements based on the evaluation of the power savings values, wherein the inserted gating circuit implements the optimal clock-gating arrangement.

17. A system for deriving gated circuitry in an integrated circuit (IC), the system comprising:
   a processor; and
   a memory coupled to the processor, the memory configured to store a plurality of code modules which when executed by the processor cause the processor to:
      identify one or more state machines in a representation of the IC design;
      generate a synthesized netlist of the IC design based on the representation of the IC design;
      identify downstream logic of at least one state machine in the one or more state machines;
      analyze the downstream logic;
      determine one or more candidate blocks in the downstream logic of the synthesized netlist which are capable of being disabled;
      identify a sequential element in the one or more candidate blocks based on one or more states in the at least one state machine, wherein the one or more candidate blocks are controlled by the at least one state machine;
      identify a gating condition in the at least one state machine that inhibits a clock transition in the sequential element; and
      insert a gating circuit in the IC design for gating the one or more candidate blocks in the downstream logic.

18. The system according to claim 17, wherein the downstream logic includes a multi-cycle path.

19. The system according to claim 17, wherein the downstream logic includes a false path.

20. The system according to claim 17, wherein analysis of the downstream logic is performed for a plurality of future clock cycles in advance of a present clock cycle, and wherein the sequential element is identified as being controlled in a future clock cycle of the plurality of future clock cycles.

21. The system according to claim 20, wherein the gating condition of the at least one state machine for the present clock cycle inhibits a clock transition in the sequential element in the future clock cycle.

* * * * *